June 10, 1952   F. NETSCHERT   2,599,655
SORTING MACHINE
Filed Sept. 23, 1947   4 Sheets-Sheet 1

INVENTOR.
FRANZ NETSCHERT
BY Luther L. Mack
Attorney

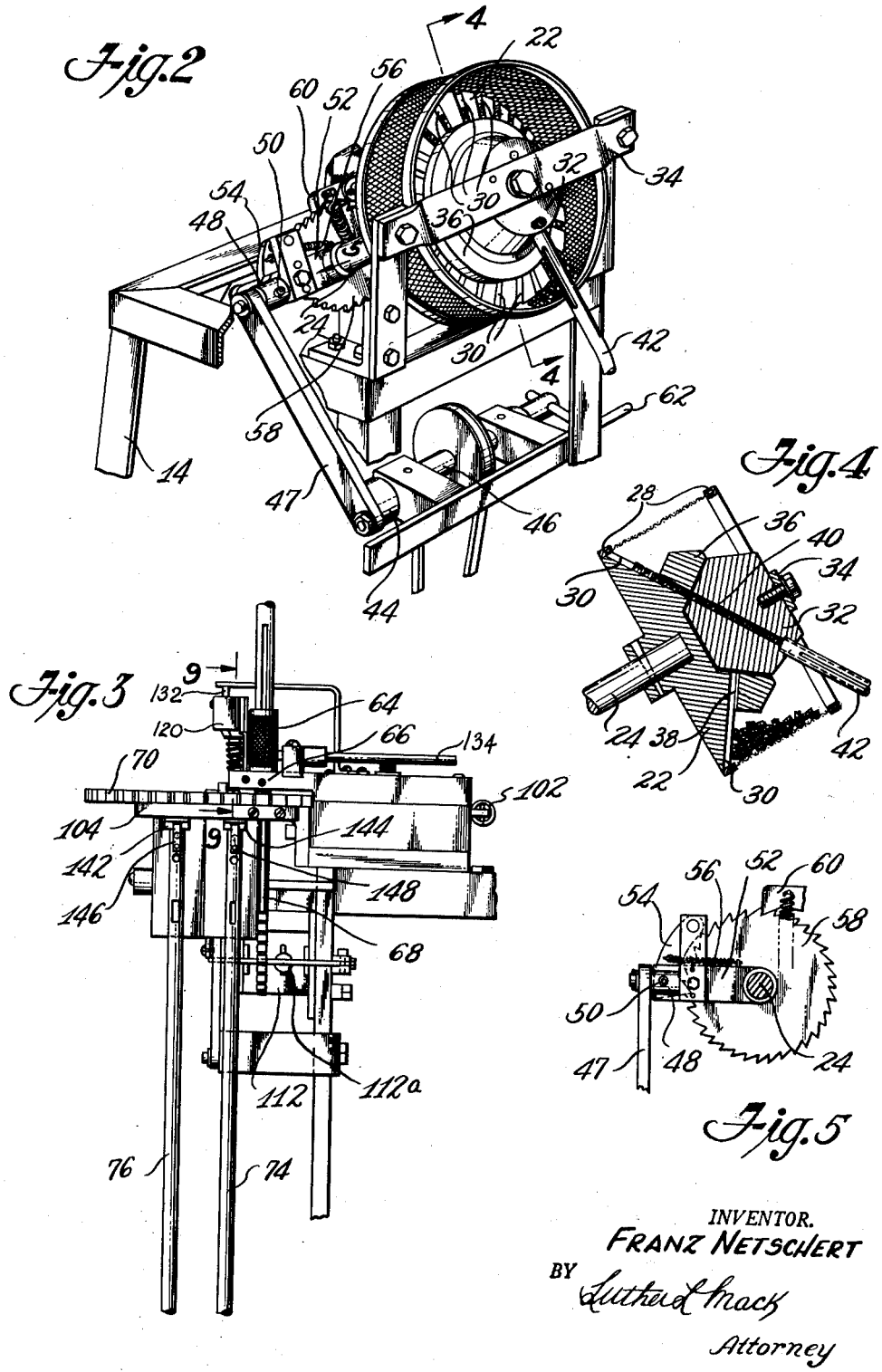

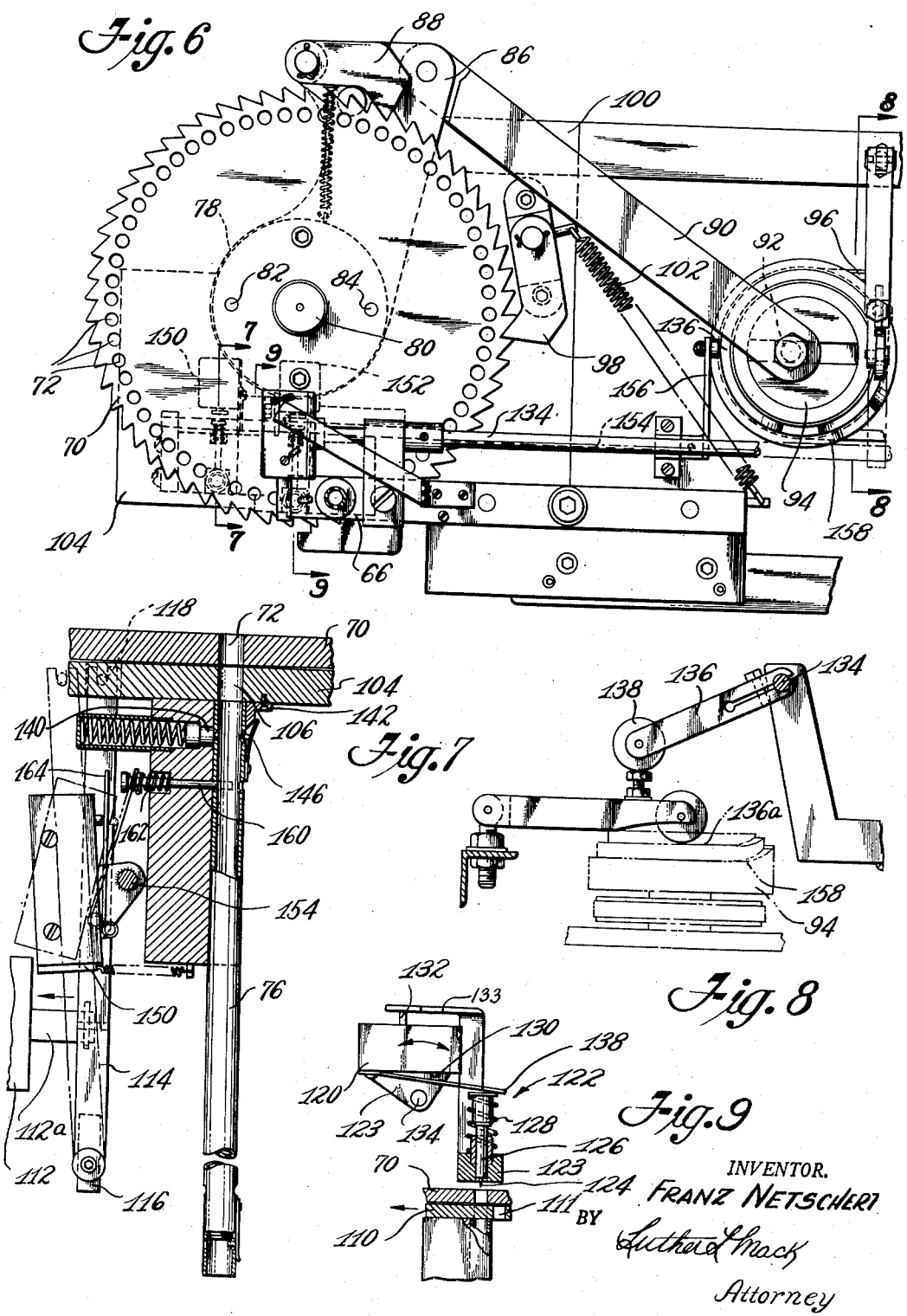

June 10, 1952   F. NETSCHERT   2,599,655
SORTING MACHINE
Filed Sept. 23, 1947   4 Sheets-Sheet 4

INVENTOR.
FRANZ NETSCHERT
BY Luther L. Mack
Attorney

Patented June 10, 1952

2,599,655

UNITED STATES PATENT OFFICE 2,599,655

SORTING MACHINE

Franz Netschert, Glendale, Calif., assignor to Technical Glass Company, Los Angeles, Calif., a corporation of California Application September 23, 1947, Serial No. 775,679

3 Claims. (Cl. 209—72)

My invention relates to a machine for sorting small parts such as set screws, taper pins and the like, which have to be positioned in a part with a certain end facing upwardly or outwardly so that the part may be operated on by an appropriate tool. Such parts are usually small in dimension and are supplied to the operators in bulk so that considerable time is lost in picking out a part and properly positioning it. The loss of time is particularly marked when the parts are driven by mechanical means, since the output of the machines could be greatly increased if it were possible to supply them with parts to be driven arranged in the proper position.

The invention will be hereinafter described with particular reference to small headless set screws, either slotted or recessed, by way of example, but it is to be understood that other small parts may be sorted by the machine of my invention, either without modification, or by making minor changes therein.

One difficulty in handling small size set screws is that they are often substantially the same in diameter and length and are apt to jam in tubular guides.

It is, accordingly, one object of the invention to provide a sorting machine effective to arrange parts having substantially identical dimensions but supplied to a hopper in jumbled relation in magazines so that one magazine will contain the parts with one end upwardly and another magazine will contain parts with the opposite end upwardly.

A further object of my invention is to provide a sorting machine effective to fill tubular magazines with headless parts such as set screws, one magazine containing set screws with their slotted ends upwardly, and another containing set screws with their opposite ends upward, the magazine being provided with identical end fittings serving to prevent the set screws from sliding out of the magazines when detached from the sorter for use in a screw driving machine, the fitting at whichever end is engaged, either in the sorting machine or in the screw driving machine being automatically disengaged to enable the set screws to enter the magazine in one case or to leave it in the other.

Yet another object is to provide a sorting machine assembled from a plurality of simple and rugged mechanisms thereby providing for minimum maintenance costs.

A still further object of the invention is to provide feeding means for a sorting machine capable of supplying a steady run of parts without danger of clogging of the feed and consequent loss of time.

Another object of the invention is to provide automatic means for stopping the machine when a magazine is full, the positioning of an empty magazine in the machine and restarting it taking a few seconds only.

Still further objects and features of the invention will hereinafter appear from the following description taken in conjunction with the accompanying drawings illustrating a preferred embodiment of my invention.

In the drawings:

Fig. 2 is a fragmentary detail perspective view to a larger scale of the head of the machine, as seen looking in the direction of the arrow 2 in Fig. 1;

Fig. 3 is a fragmentary detail view to a larger scale of the selecting mechanism as seen looking in the direction of the arrow 3 in Fig. 1;

Fig. 4 is a cross section on the line 4—4 in Fig. 2;

Fig. 5 is a detail plan view, looking in the direction of the arrow 5 in Fig. 2, of the rotating means for the feeding mechanism of the machine;

Fig. 6 is a plan view of the sorting mechanism and operating mechanism therefor;

Fig. 7 is a fragmentary detail in cross section to an enlarged scale on the line 7—7 of Fig. 6 showing the switches acting to switch off the machine motor when either magazine is filled;

Fig. 8 is a detail view in elevation to an enlarged scale of the driving means for the selecting mechanism, looking in the direction of the arrow 8 in Fig. 6;

Fig. 9 is a detail in cross section to an enlarged scale on the line 9—9 of Fig. 3;

Figure 1:
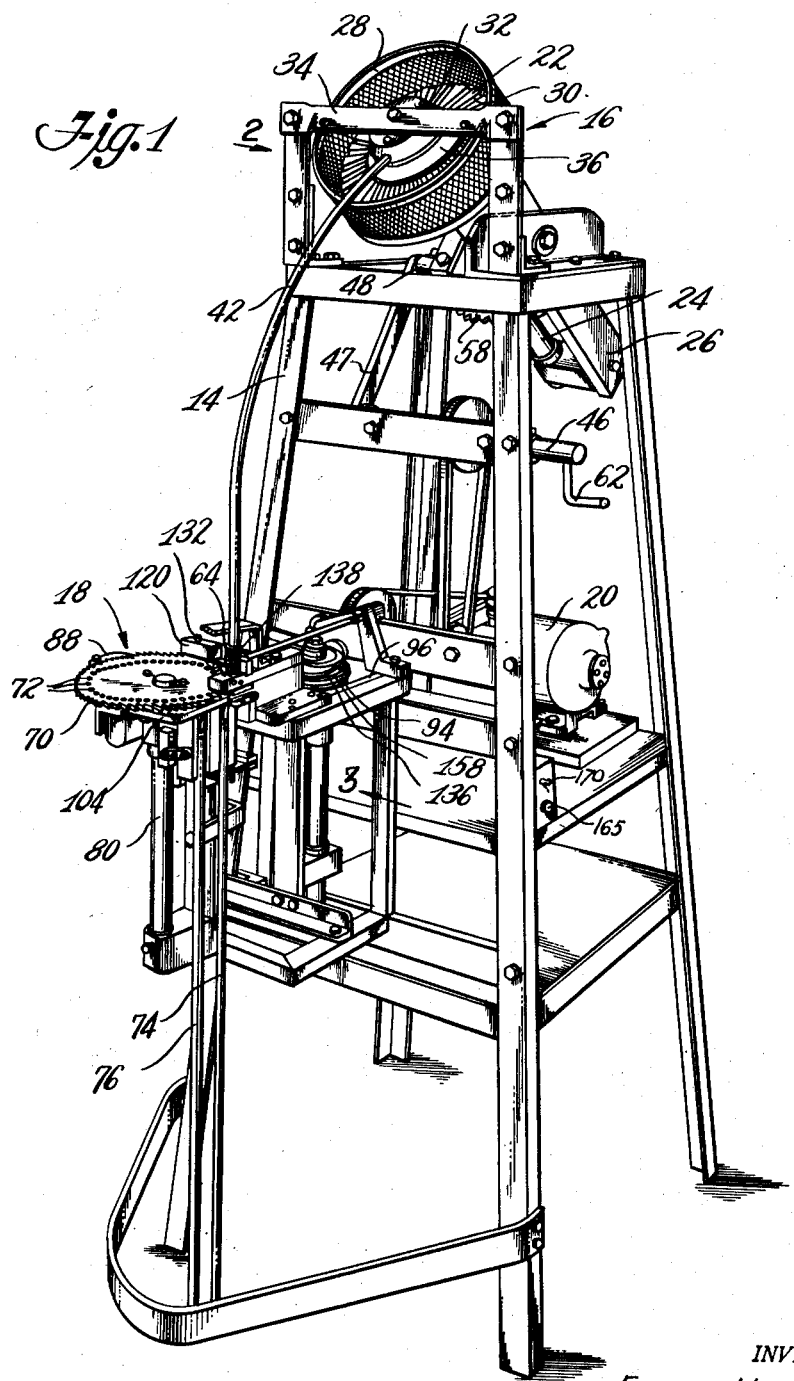
Fig. 1 is a perspective view of the complete sorting machine of my invention.
Figure 10:
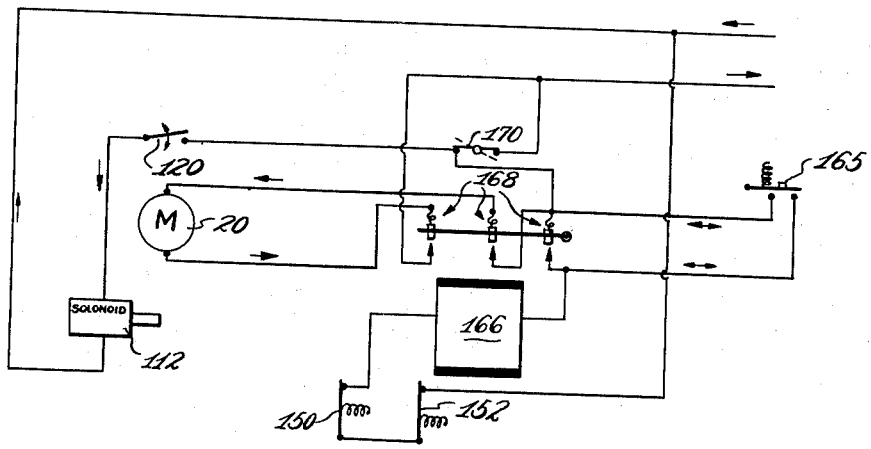
Fig. 10 is a wiring diagram of the electrical power system of the machine.
Figure 11:
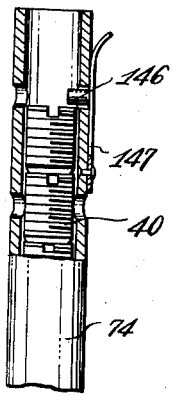
Fig. 11 is a detail in cross section of the upper end of a magazine.

The numeral 14 indicates the frame of the machine which carries the feeding mechanism shown generally at 16 at its upper end and the sorting mechanism 18 below the feeding mechanism.

An electric motor 20 is mounted on frame 14 and arranged to drive all mechanisms of the machine.

The feeding mechanism comprises a bevelled and grooved plate 22 mounted fast on a shaft 24 carried inclined in upper and lower bearings mounted on arm 26 adjustably secured in the frame.

The bevelled plate 22 is arranged in a closely fitting open top housing 28 which acts as a hopper for the parts to be sorted. The wall of the housing may be of wire mesh to permit chips and turnings or other waste accidentally present in the parts to fall out of the hopper.

Plate 22 is provided with a series of radial grooves 30, the diameter of which is equal to that of the parts, which in the embodiment described are headless set screws, and its center is bored to receive the lower end of a centrally located block 32 fixed to a cross piece 34 supported on the top of the frame.

A guide ring 36 is fixed to the center portion of the plate 22 and also fits around block 32. The center ring is furnished with grooves 38, Fig. 4, which match with the grooves in the plate to form cylindrical passages.

A single passage 40 is drilled at an angle through block 32 opening at the highest point in the upward side of the block and forming, with the grooves of the ring and bevelled plate, in turn brought into registration with passage 40, a straight inclined passage for set screws lodge radially in the grooves of the plate. Any set screws which happen to be jumbled in the grooves of the plate will not be able to slide into the passages through ring and plate and therefore cannot enter the passage through block 32.

The lower end of the passage 40 in the block is counterbored to receive the upper end of a guide tube 42 through which the set screws slide to the selector means later described.

The plate 22 is rotated step by step through a distance such as to bring successive radial grooves in the plate into registration with the passage through block 32 by parts comprising a crank 44, Fig. 2, at the end of a shaft 46 rotated by the motor, a pitman 47 mounted on the crank, and a stub 48 projecting from the free end of the pitman which is operatively connected by pin 50 to an arm 52 pivoted on the shaft 24.

Arm 52 carries a pawl 54 pivoted thereto (Fig. 5) and held by a spring 56 against the teeth of a toothed wheel 58 fastened to shaft 24. As crank 44 reciprocates the pitman pawl 54 rides over a tooth of wheel 58 and on the return movement of the pitman rotates the wheel through a distance sufficient to bring a loaded radial groove into registration with the passage through block 32 and, of course, the loaded groove previously aligned with the passage moves out of registration with the passage, the set screws therein having slid into and through the passage, or if not radially aligned, being finally tumbled into the hopper.

An indexing detent 60 under resilient pressure acts to ensure that the radial grooves in the plate are held in axial alignment with the passage through block 32 between each positively actuated movement of the plate 22.

A hand crank 62 is preferably provided for shaft 46 so that it may be manually rotated when setting or adjusting the machine, it being understood that all necessary adjustments are provided to enable articles such as set screws of different sizes to be sorted in batches, for instance, the grooved plate and block may be readily changed for others if required.

The articles are delivered by the tube 42 to the sorting mechanism now to be described.

The lower end of the tube is surrounded by a ferrule 64 longitudinally slidable on the tube and forming a prolongation thereof. The lower end of the ferrule fits on a bored socket member 66. If, for any reason, a set screw of greater length than the standard for the size being sorted reaches the sorting mechanism, it will stop the machine; but the operator, by slipping the ferrule upwardly on the tube 42 which terminates a short distance above the socket 66, and pushing a throw out rod 68 upwardly, can push the wrong sized set screw into view above the socket so that it may be readily picked out of the mechanism. It may be here stated that the machine is set to work at a speed such that there are never more than a few set screws standing on each other at the bottom of the tube.

The tube is preferably made of transparent plastic and provided with spaced slots so that the feeding of the articles may be observed and any required manipulation of the articles in the tube effected.

The sorting mechanism comprises a toothed selector plate 70 (Fig. 6) provided with a circumferentially arranged series 72 of holes of a diameter to slidably receive the articles to be sorted and to deliver them to one or the other of two vertically supported detachable tubular magazines 74, 76 according to whether the set screws are slot upwards or slot downwards.

The selector plate is rotated, notch by notch, each movement bringing a hole 72 into registry with the hole through the socket member 66. The plate 70 is mounted for accurate rotation on a turntable 78 Fig. 6 fastened to the upper end of a vertical shaft 80 carried in vertically spaced bearings mounted on the frame 14. The turntable is fitted with upwardly projecting accurately ground pins 82, 84 of different diameter fitting in accurately finished holes in the selector plate to ensure that the plate is placed always in the correct position on the turntable.

The driving means for the plate 70 comprise an arm 86, Fig. 6, pivoted on the vertical shaft 80 and a pawl 88 pivotally mounted on the arm which is rocked back and forth by means of a pitman 90 fastened on an adjustable eccentric pin 92 mounted in a cam drum 94 rotated by a belt 96 from the motor.

An indexing detent 98 is mounted on the bed plate 100 and acts under the tension of a spring 102 to hold the selector plate with a hole accurately aligned with the hole in the socket member which, of course, is aligned with the end of the supply tube 42.

The selector plate 70 is supported on a plate 104 having a hole 106 drilled therein so as to underlie the holes in the selector plate and with which a tubular magazine is aligned and receives set screws having their slots uppermost, the articles held in the holes in the selector plate sliding over the surface of the plate 104.

The second tubular magazine which receives set screws with their slotted ends downward is mounted coaxially with the supply tube and socket, but the upper end of the magazine is normally covered by a slide 110, Fig. 9, having a hole 111 therein which is operated by the core 112a of an electromagnet 112 connected to a vertical lever 114 pivoted at its lower end to a bracket 116 mounted on the frame 14 and slotted at its upper end to engage with a pin 118 extending across a slot in the slide. A tension spring secured between the lever and frame of the machine acts to hold the lever and core of the magnet in forward position and the slide also in its forward position, but permits the lever to move rearwardly when the electromagnet 112 is energized and the core drawn into the coil of the magnet. In the forward position of the slide, the hole 111 therein is out of the path of the articles held in the selector plate.

The means provided to control the actuation of the slide 110 comprise an intermittently oscillated microswitch 120 (Fig. 9) and a feeler element 122 which is mounted on a bracket or support 123 in position directly over the line of movement of the articles carried from the delivery point of the feed tube over the surface of the slide 110. The feeler element is furnished with a needle 124 located in the exact center of the articles intermittently positioned beneath it by the movement of the selector plate. Needle 124 is carried in a holder 126 having a head at its upper end and mounted for accurate vertical movement in the bracket 123. A light spring 128 normally holds the needle and holder in raised position.

The microswitch 120 is of the type which is positively closed by movement of contact 130 and positively opened by a small plunger 132. The microswitch is mounted on a rod 134 carried in bearings on the frame. Rod 134 is oscillated by an arm 136 Fig. 6 carrying a roller 138 resting on a stud adjustably mounted in a cam follower riding on a peripheral cam 136a on the cam drum 94, the construction being such as to provide a satisfactory operation of arm 136 and full adjustment of the various elements of the cam actuated elements.

As the microswitch is rocked downwardly, the tongue 138 thereof which bears on the head of the needle holder 126, moves the needle downwardly and if the slotted or recessed end of a set screw is located below the needle, the microswitch is not operated, and the set screw will be moved by subsequent rotation of the selector plate over the opening leading into the tubular magazine for set screws so segregated.

If a set screw with its point upward is below the needle on its downward movement, the needle is arrested and the tongue 138 operates the microswitch to close an electric circuit through the electromagnet causing the slide 110 to be retracted so that the hole 111 is aligned with the hole in the selector plate underlying the needle and with the opening leading to the tubular magazine receiving all set screws having their slotted or recessed ends downward.

Since the microswitch 120 will remain closed until positively opened by the upward movement thereof, engaging plunger 132 against an arm 133 mounted on the frame of the sorter, the slide remains in the position described long enough to allow the article held in the selector plate to slide downward through the hole in the slide 110 and into the magazine.

The tubular magazines 74, 76 are detachably secured in place below the plate 104 by spring pressed pins 140 (Fig. 7) engaging in a hole in the sidewall of the tubular magazines and latches 142, 144 which may be slid across the upper ends of the magazines to securely retain the magazines in position.

Both upper and lower ends of the magazines are equipped with spring detents comprising pins 146, 148 mounted on flat springs 147, 149 riveted to the surface of the tube, the pins normally projecting through holes in the ends of the tubular magazines to prevent the set screws from sliding out of the magazines. The flat springs are provided with an outwardly inclined portion at their free ends which are engaged by the latches 142, 144 when the magazines are clamped in place to withdraw the pins from the upper ends of the tubular magazines to allow set screws to enter them.

Means are provided to stop the machine when either magazine is full and, as shown in Fig. 7, comprise a normally closed microswitch, 150, 152, for each magazine. The switches are intermittently rocked by the oscillation of a rod 154 on which they are mounted and which is carried in bearings on the frame. Rod 154 is oscillated by an arm 156 carrying a roller riding on a second peripheral cam 158 on the drum cam 94.

Pins 160 are mounted in bores in the frame and are intermittently projected through holes in the walls of the magazines, light springs 162 normally holding the pins in outward position. Tongues 164 on the microswitches bear against the heads of pins 160 and act to project the pins forwardly on the forward movement of the microswitches if the magazine is not full, the resistance of the springs 162 beng insufficient to operate the microswitches, but if a magazine is full, movement of the pin is arrested, causing tongue 164 to operate the microswitch and interrupt the operating circuit of the machine.

The electrical circuit also includes a "start" push button 165 which operates to energize a solenoid 166 and close a series of contacts 168 completing the electric power circuit of the machine until interrupted by operation of either of microswitches 150, 152 or until a stop switch 170 is operated to interrupt the circuit.

It is pointed out that provision is made for the adjustment of all driving members both in the feed and the selector mechanism so that the machine may be accurately set and maintained in adjustment. Further, although the machine assembly comprises a number of cooperating mechanisms, each of said mechanisms is of simple and sturdy construction, and the interrelated movements of said mechanisms are controlled for the majority of said mechanisms by a single cam member, thus ensuring that the proper timing of the movements of the mechanisms is maintained.

While I have particularly described an embodiment of the invention performing satisfactorily in use, it is to be understood that various changes in and rearrangements of parts may be made by those skilled in the art without departing from the scope of the invention as intended to be defined by the appended claims.

I claim:

1. A sorting machine for headless parts such as set screws and the like, including: a frame member; a hopper mounted on an upper part of said frame and having an inclined bottom plate; means for rotating said plate in a step by step manner, a radially arranged series of grooves in the upper surface of the inclined plate of a diameter substantially equal to that of the parts and arranged in an outer annular zone of the surface of the plate, bores aligned with said grooves and arranged in an inner annular zone of the surface of the plate, and a central opening in the inclined plate; a stationary head carried on a frame member and positioned in said central opening and having an inclined passage therethrough of the same diameter as the bores, one of the bores and upper end of the passage being aligned at the end of each movement of the plate; a horizontal rotatory selector plate mounted below said hopper and provided with circumferentially spaced bores, a feed tube leading from an outlet from said hopper to a point above said selector plate, a connection at the lower end of said passage to receive the upper end of said feed tube maintaining the parts in end to end relation; means effective to maintain the registration of said bores and passage until the next rotary movement of the plate; movable selector means to which the parts are delivered; and operating means effective to move the elements of the machine in timed relation.

2. A sorting machine for headless parts of equal length and diameter, such as set screws and the like, including: a frame member; a hopper mounted on said frame member and adapted to contain a supply of said parts in jumbled relation; a horizontal rotatory selector plate provided with a circumferentially arranged series of bores and arranged at a lower level than said hopper; a feed tube to supply the parts from the hopper to the bores of the selector plate; an inclined plate arranged to form the bottom of the hopper and provided with a series of radial guiding grooves in the upper surface thereof; means effective to rotate the inclined plate by a series of movements to bring a radial passage into alignment at the end of each movement of the plate with the upper end of the feed tube; a feeler element responsive to differences between the end portions of the parts carried by the selector plate into operative position relative to the feeler means; magazines positioned to receive the parts passed through the selector means; and means actuated by the feeler means effective to direct the parts to the magazines in accordance with the characteristic of the parts so that identically arranged parts are deposited in the magazines but the arrangement of parts in one magazine is different from the arrangement of the parts in another magazine; and operating means effective to move the elements of the machine in timed relation said radially arranged series of grooves in the upper surface of said inclined plate being of a diameter substantially equal to that of the parts and arranged in an outer annular zone of the surface of the plate, bores aligned with said grooves and arranged in an inner annular zone of the surface of the plate, and a central opening in the inclined plate; a stationary head carried on the frame member and positioned in said central opening and having an inclined passage therethrough of the same diameter as the bores, one of the bores and upper end of the passage being aligned at the end of each movement of the plate; a connection at the lower end of the passage to receive the upper end of said feed tube; means effective to maintain the registration of said bores and passage until the next rotary movement of the plate; and operating means effective to move the elements of the machine in timed relation.

3. A sorting machine as characterized in claim 2 in which said selector means is formed as a plate mounted on the frame at a lower level than said hopper and provided with a series of recesses adapted to receive parts and maintain them in the position in which they are delivered to said recesses; a stationary tubular socket element carried on the frame to position the lower end of the feed tube in alignment with the part receiving recesses in the selector plate; a ferrule slidably fitted on the lower end of the feed tube and effective to hold the lower end of the feed tube in registration with, but spaced from, said socket member, a plate carried by the frame and underlying the selector plate with a passage drilled therein in registration with said tubular socket member, and a push-out rod mounted in said passage whereby any part failing to properly enter the part receiving recesses of the selector plate aligned with the feed tube and socket bore may be pushed upwardly out of the selector plate and socket by said rod and removed by sliding said ferrule upwardly to expose said part for removal.

FRANZ NETSCHERT.

REFERENCES CITED

The following references are of record in the file of this patent:

UNITED STATES PATENTS

| Number | Name | Date |
| --- | --- | --- |
| 745,417 | Church | Dec. 1, 1903 |
| 1,676,879 | Wallin | July 10, 1928 |
| 1,729,843 | Reich | Oct. 1, 1929 |
| 1,835,382 | Cunningham | Dec. 8, 1931 |
| 2,124,858 | Marchand | July 26, 1938 |
| 2,422,036 | Oakley | June 10, 1943 |
| 2,407,062 | Darrah | Sept. 3, 1946 |